United States Patent [19]

Barthel

[11] 3,811,342
[45] May 21, 1974

[54] A MINI-BIKE TWO-SPEED PLANETARY TRANSMISSION WITH STATIONERY RING, CARRIER OUTPUT AND NOVEL CLUTCHING MEANS

[76] Inventor: Ray L. Barthel, 11017 S. Parkside, Chicago Ridge, Ill. 60415

[22] Filed: Aug. 25, 1972

[21] Appl. No.: 283,747

[52] U.S. Cl. .............................................. 74/750 R
[51] Int. Cl. ............................................... F16h 3/44
[58] Field of Search ...................... 74/750 R, 750 B

[56] References Cited
UNITED STATES PATENTS
2,787,919   4/1957   Senkowski et al. ............... 74/750 R
1,740,315  12/1929   Rebikoff ........................... 74/750 R
3,477,314  11/1969   Rutkowski ........................ 74/750 R
1,695,214  12/1928   Sorensen ........................... 74/750 R FOREIGN PATENTS OR APPLICATIONS
638,047   5/1928   France .............................. 74/750 R Primary Examiner—Samuel Scott
Assistant Examiner—Allan Russell Burke
Attorney, Agent, or Firm—Johnson, Dienner, Emrich, Verbeck & Wagner

[57] ABSTRACT

A mini-bike transmission or the like embodies a planetary gear structure in which the sun gear and a carrier for the planet gears freely rotate on a driven shaft. A clutch element keyed to said shaft is shiftable axially thereof to selectively clutch the sun gear and planet gear carrier to the shaft such that an output sprocket which is fixed to the carrier turns with rotation of the driven shaft, the clutch having an intermediate neutral position where neither the sun gear nor the carrier is clutched and the driven shaft rotates free thereof.

6 Claims, 7 Drawing Figures

PATENTED MAY 21 1974 3,811,342

A MINI-BIKE TWO-SPEED PLANETARY TRANSMISSION WITH STATIONERY RING, CARRIER OUTPUT AND NOVEL CLUTCHING MEANS

This invention relates to change speed mechanisms, and a principal object of the invention is to provide a two-speed transmission of simple inexpensive construction which is particularly useful in bicycles, minibikes, snowmobiles and like vehicles.

In accordance with this invention such a mechanism embodies a planetary gear structure, the sun gear and planetary gear carrier of which are rotatable about a driven shaft and a lever-operated clutch keyed to the driven shaft is axially slidable thereon to selectively clutch the sun gear or planet gear carrier to the driven shaft for rotation therewith, the transmission having an output sprocket wheel or the like which is fixed to the carrier so that it rotates therewith at a speed determined by whether the carrier is directly clutched to the driven shaft or is rotated by the sun gear which meshes with the planet gear or gears on the carrier.

Thus, an important feature of the invention is that under one condition the output wheel or other driven element of the transmission is directly clutched to the input wheel or other driving element and the transmitted speed is a function of the related diameters of the input and output wheels, whereas under a second condition the output wheel is driven through the planetary gear at a second and lower speed which is a function of the relationship of the sun and planet gears.

Another feature of the invention is that the sun gear and planet gear carrier have means which are selectively interlocked with the slidable clutch at opposite extreme positions of its axial adjustment on the driven shaft.

A further feature of the invention is that the slidable clutch element passes through a neutral position midway between said opposite extreme positions such that its disengagement with the sun gear or planet gear carrier always occurs in advance of clutching the driven shaft to the other for efficient smooth shifting between speeds.

Still another feature of the invention is the telescoping relation of the clutch element about the interlocking means of the sun gear so that the clutch element interlocks with the planet gear carrier in its extreme position adjacent the planetary gear structure and interlocks with the sun gear in its extreme position remote therefrom, permitting a simple uncomplicated but compact transmission structure and one occupying a minimum amount of space.

Still another feature of the invention is the free floating mount of both the sun gear and planetary gear carrier on the driven shaft and the provision of interlocking means in the form of circumferentially spaced projections which automatically engage and disengage with corresponding spaced wings or projections on the clutch element as the latter is moved axially into and out of its extreme positions along the driven shaft.

A still further feature of the invention is the novel assembly of operating lever with the slidable clutch element which facilitates movement of the lever axially of the driven shaft in the directions required of the clutch element to assume its two speed and intermediate neutral positions, the clutch element remaining free to rotate with the driven shaft in each of said positions.

Many other features, as well as objects and advantages of the invention will be at once apparent or will become so upon consideration of a preferred embodiment of the invention which now will be described in connection with the accompanying drawing.

In said Drawing:

FIG. 7 illustrates the interlocking means of the sun gear with which the clutch element interlocks when in the position illustrated by FIG. 1.

Figure 1:
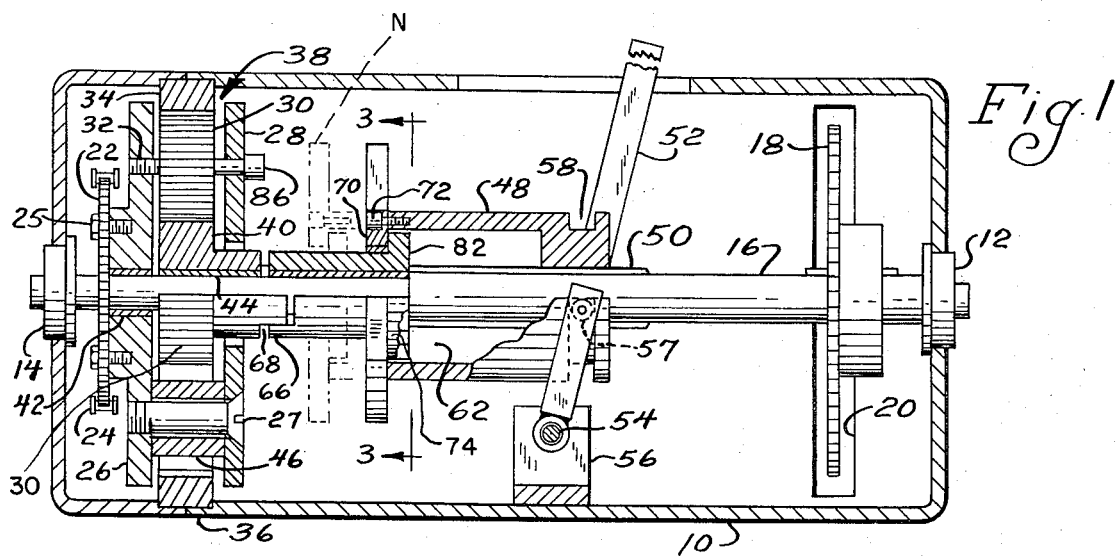
FIG. 1 is a vertical sectional view taken through a transmission constructed in accordance with this invention and shows the clutch located in a first speed position.

Referring now more specifically to the several views wherein like parts are identified by like reference numerals, FIG. 1 illustrates a transmission constructed according to this invention as mounted within an enclosing casing 10 which provides rotative bearing support at 12 and 14 for a driven shaft 16. Fixed on shaft 16 adjacent one end is an input sprocket wheel or other driving element 18 driven by a motor (not shown) which has access thereto through an opening 20 in the casing sidewall. At the opposite end of shaft 16 and freely rotatable relative thereto is an output sprocket wheel 22 or other driven element connected as by chain 24 to drive the rear wheel axle (not shown) of a minibike, snowmobile or other vehicle on which the transmission is utilized.

As illustrated in FIG. 1, output sprocket wheel 22 is fixed as by screws 25 to the hub portion of a planet gear carrier and more specifically to carrier plate 26 thereof which freely rotates on shaft 16. Plate 26, in turn, is threadedly connected to a second or inner plate 28 as by screws 27 which pass through provided spacers 46 so as to maintain the plates in a predetermined spaced relation. Between said spacers 46 plates 26,28 rotatably support one or more planet gears 30 of a planetary gear system 38 on stub shafts 32 for meshing engagement with the teeth of an outer surrounding ring gear 34 disposed between said plates 26,28 and affixed by structure 36 to the wall of casing 10. In this embodiment three planet gears 30 are employed, of which two are visible in both FIGS. 1 and 4. Said planet gears 30 also have meshing engagement with a sun gear 40 which freely rotates on shaft 16. Suitable bearing structure may be provided as at 42 and 44 which promote free rotation of the planet gear carrier plate 26 and sun gear 40 respectively on the driven shaft 16.

Figure 3:
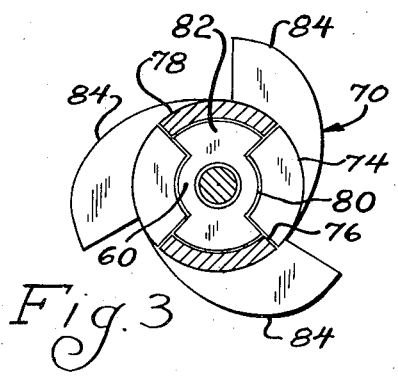
FIG. 3 is a cross sectional view taken along the lines 3—3 of FIG. 1 looking in the direction indicated by the arrows.
Figure 6:
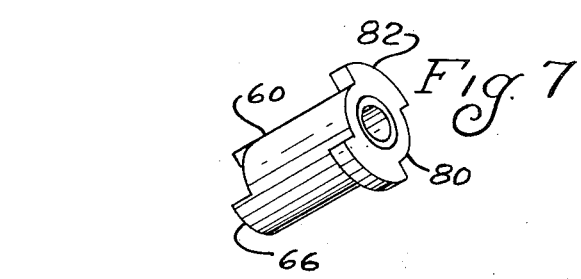
FIG. 6 illustrates the interlocking means of the clutch element and is shown detached from the main body of the clutch element.
Figure 6:
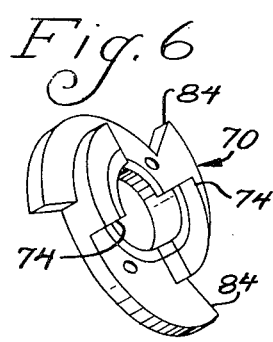
Figure 5:
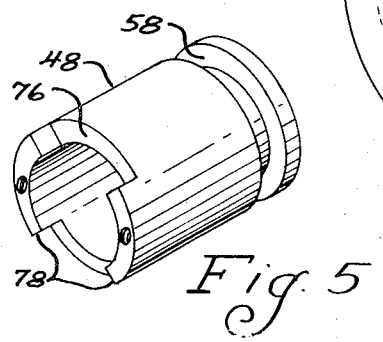
FIG. 5 illustrates the clutch element separated from the driven shaft on which it is slidably mounted in a transmission according to this invention.

It is a feature of this invention that means are provided by which the driven shaft may be directly clutched to the planet gear carrier so that the output sprocket wheel 22 rotates with the driven shaft 16 at one speed or it may be clutched to the sun gear 40 so that the output wheel is rotated through the intermediary of the planetary gear system 38 (sun gear 40, planet gears 30 and outer ring gear 34) at a different speed of rotation than shaft 16. For this purpose a clutch comprises a slide element referenced at 48 is keyed as at 50 to rotate with the driven shaft 16 and is slidable axially of said shaft 16 between a pair of extreme positions through the operation of a lever 52. As illustrated in FIG. 1, lever 52 is pivotally connected in offset relation to shaft 16 therebelow as by a pivot member 54 mounted on stanchion 56 secured to the casing 10. Preferably, at least the pivoted lower end of the operating lever 52 is U-shaped so that it straddles the clutch element 48 and is provided with a pair of axially aligned pins 57 which ride within a continuous groove or peripheral channel 58 about the slidable clutch element 48. Clutch element 48 therefore remains free to rotate with shaft 16 to which it is keyed. However, it is also slidable axially of shaft 16 in response to pivoting of the operating lever 52. In a first extreme position of lever 52 and clutch 48 illustrated in FIG. 1, sun gear 40 is clutched by the latter so that the sun gear rotates with shaft 16. This obtains via an interlocking drive element 60 having one end which extends within hollow interior 62 of the clutch element 48 and is held against shoulder 64 of the shaft 16, its opposite end having cutouts which form circumferentially spaced projections 66 interfitting with cutouts 68 in the hub of the sun gear 40. Drive element 60 may also be an integral part of the sun gear hub. Clutch element 48 is provided with interlocking means in the form of a plate 70 secured to the left hand end of clutch element 48 as by screws 72. As illustrated by FIGS. 3 and 6, plate 70 has a pair of inwardly located projections 74 which extend within recesses 76 between projections 78 of the clutch element 48. These projections 74 also have a sufficient radial dimension that they also engage in cutouts 80 between provided projections 82 on drive member 60. Thus, with the operating lever 52 in its position of FIG. 1 moved as far to the right as possible, drive element 60 is clutched by the clutch element 48 to shaft 16 so that it rotates therewith. Drive element 60 also being interlocked to the sun gear 40, sun gear 40 turns with the driven shaft 16. As sun gear 40 turns with shaft 16 its rotary movement is translated to the planet gears 30. The planet gear being in mesh with ring gear 34 which does not turn, the planet gears therefore revolve about the sun gear causing the planet gear carrier plate 26 to rotate with said revolution about shaft 16 and thereby to rotate the output sprocket wheel 22 bolted thereto.

Figure 2:
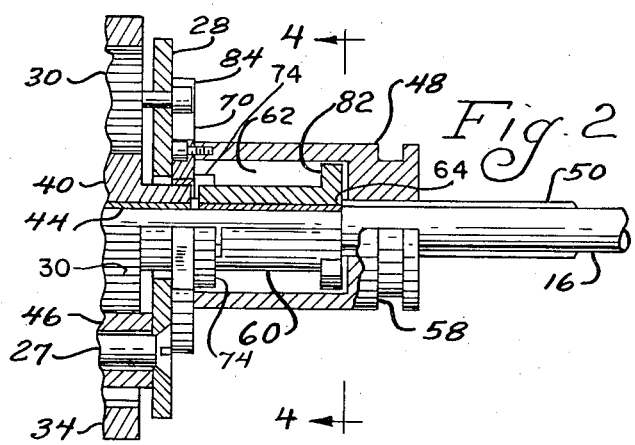
FIG. 2 is a partially fragmented view of the transmission illustrated in FIG. 1 and illustrates the clutch element located in a second speed position.
Figure 4:
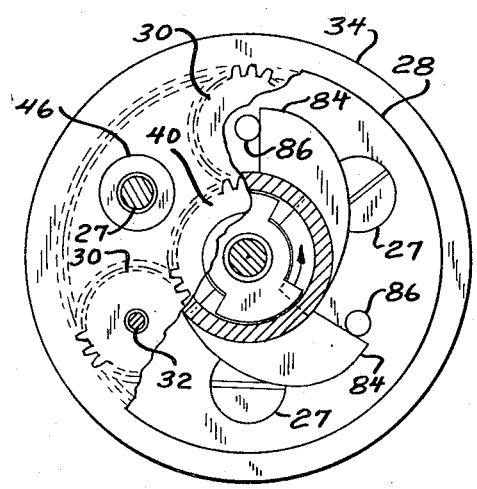
FIG. 4 is a cross sectional view taken along lines 4—4 of FIG. 2 looking in the direction indicated by the arrows.

As shown in FIGS. 3 and 4, plate 70 also has spaced outwardly located wings 84 parallel to and adjacent the plane of its inwardly located projections 74 which may be brought into engagement with the projecting head portions 86 of the stud shafts 32 on the planet gear carrier plate 28 when clutch 48 is moved by operation of lever 52 to its alternate or second position illustrated by FIG. 2. It will be understood, of course, that the hollow interior 62 has an axial dimension which permits the clutch element 48 to be longitudinally shiftable on the shaft 16 between its first and second positions. The heads of stud shafts 32 may be flush or recessed with respect to the outer surface or plate 28 and in this event projections separate from head portions 86 would be provided on plate 28 for engagement by said wings 84.

Referring now to said FIG. 2, it will be seen that as clutch element 48 is moved to the left, its inwardly located projections 78 are dislodged from between projections 82 of drive element 60 so that the sun gear 40 is no longer driven by rotation of shaft 16. However, in this new or alternate position of the clutch, wings 84 on its plate 70 have been moved into a new plane containing projections 86 wherefore the planetary gear carrier through plates 26 and 28 is now directly clutched to shaft 16 and the output sprocket wheel 22 now rotates with shaft 16, the sun gear 40 idling free of shaft 16.

In the second position of clutch 48 illustrated by FIG. 2, the output sprocket wheel 22 is rotated at a speed which is directly proportional to the related diameters of the shaft 16 and the sprocket wheel 22 itself, whereas in the first described position of clutch 48 illustrated by FIG. 1, the rotational speed of the sprocket wheel is determined by the related diameters, number and pitch of the teeth of the gears making up the planetary gear system 38 which interpose between the driven shaft 16 and the carrier plate 26 on which the output sprocket wheel 22 is mounted.

It will be further understood that as illustrated best in FIG. 1, projections 86 have their outer extremities lying in a plane sufficiently close to plate 28 and remote from a plane including projections 82 of drive member 60 that as clutch 48 is moved by operation of the lever 52 between its first and second speed positions illustrated by FIGS. 1 and 2 respectively, the clutch 48 always passes through a neutral position indicated by phantom lines N in FIG. 1 in which position its outwardly located wings 84 are out of engagement with projections 86 on the planet carrier plate 28 and its inwardly located projections 74 are also out of engagement with the cutouts between projections 82 on the drive element 60 interlocked to the sun gear 40. In this neutral position of the clutch, therefore, the driven shaft 16 continues to rotate but the output wheel 22 does not turn. Lever 52 is operable at will to move its wing bearing plate 70 into or out of engagement with projections 86 or 82, always passing through a neutral position, thus avoiding possible damage to the transmission; and in each instance, their freely rotating elements 60 or carrier 28, as the case may be, are free to yield to the projections 74, wings 84 of the clutch element to facilitate said driving engagement as well as disengagement.

As thus described, it will be apparent that a transmission in accordance with the invention can be extremely simple in construction, that it can be made very compact but at the same time is one that may be operated efficiently and effectively to change drive speeds at the will of the operator.

Thus having described my invention, I claim:

1. In a change speed transmission, a rotatable input shaft, a sun gear and a planet gear carrier each mounted on the input shaft to be rotatable thereabout and independently of the input shaft, a fixed ring gear and at least one planet gear rotatably supported by the carrier and in mesh with the sun gear and the ring gear such that the carrier rotates about the input shaft with rotation of the sun gear, an output wheel fixed to the carrier to rotate therewith about the input shaft, the carrier having an engageable portion to one side of the sun gear and radially spaced from the input shaft, the sun gear including a radial extending projection on the one side thereof and spaced beyond a plane through which the engageable portion moves with rotation of the carrier, and an axially shiftable hollow clutch member mounted on the input shaft to turn therewith, the radial extending projection of the sun gear being disposed in the hollow of the clutch member, the clutch member having an interiorly located projection and an exteriorly located projection adjacent the end thereof toward the sun gear and the carrier, the clutch mamber having a first position on the input shaft having the interiorly located projection drivingly engaging with the radial extending projection of the sun gear such that the sun gear turns with rotation of the input shaft to rotate the carrier and the output wheel fixed thereto at a first speed, the clutch element being axially shiftable of the input shaft to a second position closer to the sun gear where the interiorly located projection is out of engagement with the radial extending projection of the sun gear and the exteriorly located projection is in the plane of the engageble portion of the carrier to drivingly engage the engageable portion and the carrier as well as the output wheel fixed thereto at a second speed such that the carrier and the output wheel turns with direct rotation of the input shaft and the sun gear rotates freely of the input shaft, the axial spacing of the interiorly and exteriorly located projections of the clutch member being less than the spacing of the radial extending projection of the sun gear from the plane through which the engageable portion moves such that in an intermediate position of the clutch member between its first and second positions both the interiorly located and the exteriorly located projections of the clutch member are out of engagement with the respective radial extending projection of the sun gear and the engageable portion and the input shaft turns free of the output wheel.

2. The combination of Claim 1 wherein the clutch element includes a continuous recess about the periphery thereof, and an operating lever pivotally mounted in offset relation to the input shaft, the lever having a part riding in said continuous recess, and the lever being pivotal in a direction longitudinally of the input shaft to shift the clutch element between the first and second positions, the clutch element being free to rotate with the input shaft in each of the first and second positions of the operating lever.

3. The transmission as defined in claim 2, wherein both the interiorly and the exteriorly located projections are integrally connected together and detachably mounted to the clutch element.

4. The transmission as defined in claim 2, wherein the sun gear includes cutouts and the radial extending projections comprises a drive member freely rotatable on the shaft having cutouts which interfit with said cutouts of the sun gear to provide a detachable connection therebetween.

5. The transmission as defined in claim 4 further including, a restraining means on the input shaft adjacent an end of the drive member opposite from the end thereof including the cutouts, the restraining means inhibiting the radial extending projection of the drive member from axial movement relative to the input shaft.

6. In a change speed transmission, a rotatable input shaft, a sun gear and a planet gear carrier each mounted on the input shaft to be rotatable thereabout and independently of the input shaft, a fixed ring gear and at least one planet gear rotatably supported by the carrier and in mesh with the sun gear and the ring gear such that the carrier rotates about the input shaft with rotation of the sun gear, an output member fixed to the carrier to rotate therewith about the input shaft, the carrier having equi-spaced engageable portions to one side of the sun gear and readially spaced from the input shaft, the sun gear including radial extending circumferentially spaced projections on the one side thereof and disposed beyond a plane through which the engageable portions move with rotation of the carrier, a clutch element keyed to rotate with the input shaft and being axially shiftable thereon between a first position remote from the sun gear and a second position close thereto, the clutch element including a hollow interior in which the radial extending projections are received and the axial dimension of the hollow interior permitting shifting of the clutch element between its first and second positions, the clutch member having circumferentially spaced interiorly located projections and circumferentially spaced exteriorly located projections adjacent the end thereof toward the sun gear and the carrier, the clutch member having a first position on said input shaft whenever the interiorly located projections drivingly engaging with the radial extending projections of the sun gear such that the sun gear turns with rotation of the input shaft to rotate the carrier and the output member fixed thereto at a first speed, the clutch element being axially shiftable of the input shaft to the second position closer to the sun gear where the interiorly located projections are out of engagement with the radial extending projections of the sun gear and the exteriorly located projections are in the plane of the engageable portions of the carrier to drivingly engage the engageable portions and the carrier as well as the output member fixed thereto at a second speed such that the carrier and the output member turn with direct rotation of the input shaft and the sun gear rotates freely of the input shaft, the axial spacing of the interiorly and exteriorly located projections of the clutch member being less than the spacing of the radial extending projection of the sun gear from the plane through which the engageable portion moves such that in an intermediate position of the clutch member between its first and second positions both the interiorly located and the exteriorly located projections of the clutch member are out of engagement with the respective radial extending projection of the sun gear and the engageable portion and the input shaft turns free of the output member.

* * * * *